United States Patent
Lee et al.

(10) Patent No.: US 9,008,101 B2
(45) Date of Patent: Apr. 14, 2015

(54) SCHEDULING BASED ON CHANNEL STATUS

(71) Applicant: KT Corporation, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 209 days.

(21) Appl. No.: 13/707,968

(22) Filed: Dec. 7, 2012

(65) Prior Publication Data
US 2013/0148597 A1  Jun. 13, 2013

(30) Foreign Application Priority Data
Dec. 7, 2011  (KR) .................. 10-2011-0130549

(51) Int. Cl.
*H04L 12/28*  (2006.01)
*H04W 72/12*  (2009.01)

(52) U.S. Cl.
CPC ...... *H04W 72/1236* (2013.01); *H04W 72/1226* (2013.01)

(58) Field of Classification Search
CPC ......... H04W 4/02; H04W 4/22; H04W 24/08; H04W 24/10; H04W 72/042; H04L 5/0053; H04L 47/50; H04L 1/0026; H04L 1/1861
See application file for complete search history.

(56) References Cited

U.S. PATENT DOCUMENTS

| | | | |
|---|---|---|---|
| 8,423,856 B2 * | 4/2013 | Cai ............................. | 714/748 |
| 8,767,668 B2 * | 7/2014 | Luschi et al. .................. | 370/330 |
| 2005/0281232 A1 * | 12/2005 | Kim et al. ..................... | 370/335 |
| 2007/0155337 A1 * | 7/2007 | Park et al. ..................... | 455/69 |
| 2007/0230397 A1 * | 10/2007 | Sakata ........................... | 370/329 |
| 2007/0243874 A1 * | 10/2007 | Park et al. ..................... | 455/442 |
| 2009/0003282 A1 * | 1/2009 | Meylan et al. ................. | 370/331 |
| 2009/0103500 A1 * | 4/2009 | Malkamaki et al. .......... | 370/336 |
| 2010/0085927 A1 * | 4/2010 | Torsner et al. ................ | 370/329 |
| 2010/0254469 A1 * | 10/2010 | Luschi et al. ................. | 375/260 |
| 2010/0275086 A1 * | 10/2010 | Bergquist et al. ............. | 714/748 |
| 2010/0298006 A1 * | 11/2010 | Ko et al. ..................... | 455/452.2 |
| 2010/0316096 A1 * | 12/2010 | Adjakple et al. ............. | 375/211 |
| 2011/0002306 A1 * | 1/2011 | Liu ............................... | 370/331 |
| 2011/0038334 A1 | 2/2011 | Huang et al. | |
| 2011/0134829 A1 * | 6/2011 | Chen et al. .................... | 370/328 |
| 2011/0141890 A1 * | 6/2011 | Giaretta et al. ............... | 370/232 |

(Continued)

FOREIGN PATENT DOCUMENTS

| | | |
|---|---|---|
| JP | 2011-188179 A | 9/2011 |
| JP | 2011-228940 A | 11/2011 |

(Continued)

OTHER PUBLICATIONS

Yasir Zaki et al., "Multi-QoS-aware Fair Scheduling for LTE", IEEE, 2011.

*Primary Examiner* — Bunjob Jaroenchonwanit
(74) *Attorney, Agent, or Firm* — IP Legal Services, LLC

(57) ABSTRACT

The disclosure is related to performing a packet scheduling in a wireless communication network. Quality of service (QoS) information associated with user equipment may be obtained in the wireless communication network. A channel status associated with the user equipment may be estimated in the wireless communication network. A scheduling interval may be determined based on the QoS information and the channel status.

18 Claims, 4 Drawing Sheets

(56) References Cited

U.S. PATENT DOCUMENTS

| | | | |
|---|---|---|---|
| 2011/0170500 A1* | 7/2011 | Kuo et al. | 370/329 |
| 2011/0188463 A1 | 8/2011 | Kim | |
| 2011/0195716 A1* | 8/2011 | Hapsari et al. | 455/436 |
| 2012/0052894 A1* | 3/2012 | Manssour et al. | 455/509 |
| 2012/0093019 A1* | 4/2012 | Zhang et al. | 370/252 |
| 2012/0099564 A1* | 4/2012 | Bekiares et al. | 370/336 |
| 2012/0127883 A1* | 5/2012 | Chang et al. | 370/252 |
| 2012/0177016 A1* | 7/2012 | Trainin et al. | 370/338 |
| 2012/0218966 A1* | 8/2012 | Yamazaki et al. | 370/329 |
| 2012/0224564 A1* | 9/2012 | Paisal et al. | 370/331 |
| 2012/0257531 A1* | 10/2012 | Ko et al. | 370/252 |
| 2012/0289220 A1* | 11/2012 | Yang et al. | 455/422.1 |
| 2013/0022146 A1* | 1/2013 | Chen et al. | 375/267 |
| 2013/0064173 A1* | 3/2013 | Sivavakeesar et al. | 370/315 |
| 2013/0100936 A1* | 4/2013 | Pettersson | 370/336 |
| 2013/0142052 A1* | 6/2013 | Burbidge et al. | 370/242 |
| 2013/0148597 A1* | 6/2013 | Lee et al. | 370/329 |
| 2013/0155997 A1* | 6/2013 | Cai et al. | 370/329 |
| 2013/0170406 A1* | 7/2013 | Kishiyama | 370/280 |
| 2013/0176975 A1* | 7/2013 | Turanyi et al. | 370/329 |
| 2013/0294247 A1* | 11/2013 | Zhu et al. | 370/235 |
| 2014/0126517 A1* | 5/2014 | Choi et al. | 370/329 |
| 2014/0169276 A1* | 6/2014 | Choi et al. | 370/328 |

FOREIGN PATENT DOCUMENTS

| | | |
|---|---|---|
| KR | 10-2011-0089772 A | 8/2011 |
| KR | 10-2011-0099327 A | 9/2011 |

* cited by examiner

SCHEDULING BASED ON CHANNEL STATUS

CROSS REFERENCE TO PRIOR APPLICATIONS

The present application claims priority under 35 U.S.C. §119 to Korean Patent Application No. 10-2011-0130549 (filed on Dec. 7, 2011), which is hereby incorporated by reference in its entirety.

FIELD OF THE INVENTION

The present invention relates to communication and, in particular, to performing a packet scheduling based on a channel status associated with user equipment in a wireless communication network.

BACKGROUND OF THE INVENTION

A typical wireless telecommunication system, such as a long term evolution (LTE) system, uses downlink resources in order to assign resources to user equipment whenever transmitting data, in case of a telecommunication service where an amount of data transmission is constant. This may result in an unnecessary amount of overhead. For this reason, a semi-persistent scheduling (SPS) technique has been introduced as an efficient resource assignment technique for the telecommunication service transmitting a constant amount of data.

A communication channel status associated with user equipment (UE) may be changed depending on a movement of UE and/or a telecommunication environment. However, the SPS technique does not reflect a channel status associated with UE when performing a scheduling procedure.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a packet scheduling interval such as a semi-persistent scheduling (SPS) interval may be determined based on quality of service (QoS) information and channel status associated with user equipment (UE).

In accordance with an embodiment of the present invention, a method may be provided for performing a packet scheduling in a wireless communication network. The method may include obtaining quality of service (QoS) information associated with user equipment, estimating channel status associated with the user equipment, and determining a scheduling interval based on the obtained QoS information and the estimated channel status.

The method may further include controlling at least one of an uplink transmission and a downlink transmission according to the determined scheduling interval.

The controlling may include transmitting the determined scheduling interval to the user equipment in case of the uplink transmission.

The obtaining may include receiving a bearer setup request message from a mobility management entity (MME), and extracting the QoS information from the received bearer setup request message.

The extracting may include obtaining a guaranteed bit rate (GBR), and packet delay information defined by a QoS class identifier (QCI).

The estimating may include receiving channel status information from the user equipment, and estimating the channel status based on the received channel status information.

The channel status may include at least one of a transmission rate per transmission time interval (TTI), a maximum number of allowed users per TTI, a maximum number of hybrid automatic repeat request (HARM) retransmission, and a time delay in a wired network portion.

The determining may include establishing a transmission rate condition and a delay condition based on the obtained QoS information and the estimated channel status, and computing the scheduling interval based on whether the transmission rate condition and the delay condition are satisfied.

The scheduling interval may be a semi-persistent scheduling (SPS) interval.

The computing may include obtaining available scheduling intervals satisfying the transmission rate condition and the delay condition, and determining the available scheduling interval having a comparatively large value as the scheduling interval.

The determining may include presetting a plurality of candidate intervals, determining at least one available candidate interval based on the transmission rate condition and the delay condition, and selecting one of the available candidate intervals as the scheduling interval.

The selecting may determine an available candidate interval having a comparatively large value as the scheduling interval.

The candidate intervals may be differently predetermined depending on whether the scheduling interval is for the uplink transmission or the downlink transmission.

In accordance with another embodiment of the present invention, an apparatus may be provided for performing a packet scheduling in a wireless communication network. The apparatus may include a service quality information obtaining unit, a channel status estimation unit, and a scheduling interval determination unit. The service quality information obtaining unit may be configured to obtain quality of service (QoS) information associated with user equipment. The channel status estimation unit may be configured to estimate channel status associated with the user equipment. The scheduling interval determination unit may be configured to determine a scheduling interval based on the obtained QoS information and the estimated channel status.

The apparatus may further include a transmission control unit. The transmission control unit may be configured to control at least one of an uplink transmission and a downlink transmission according to the determined scheduling interval.

The scheduling interval may be a semi-persistent scheduling (SPS) interval.

The scheduling interval determination unit may be configured to establish a transmission rate condition and a delay condition based on the obtained QoS information and the estimated channel status, and to compute the scheduling interval based on whether the transmission rate condition and the delay condition are satisfied.

The scheduling interval determination unit may be configured to store a plurality of preset candidate intervals, to determine at least one available candidate interval based on the transmission rate condition and the delay condition, and to select one of the available candidate intervals as the scheduling interval.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
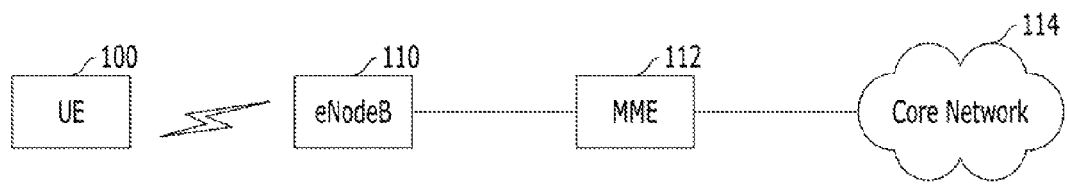
FIG. 1 illustrates a communication network for performing packet scheduling.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, a base station such as eNodeB may determine a scheduling interval (e.g., a SPS interval) based on quality of service (QoS) information and/or channel status associated with user equipment (UE) in order to provide a stable data transmission. Further, the base station may control at least one of an uplink transmission and a downlink transmission according to the determined scheduling interval.

FIG. 1 illustrates a communication network for performing packet scheduling.

As illustrated in FIG. 1, a wireless telecommunication system may include user equipment (UE) 100, an evolved Node B ("eNodeB") 110, a mobility management entity (MME) 112, and a core network 114. Particularly, eNodeB 110 and MME 112 may be referred to as an LTE network. The LTE system may support mobility between various wireless access techniques, based on Internet Protocol (IP). The LTE system may include a plurality of LTE cells governed by corresponding eNodeB 110.

eNodeB 110 may be connected to UE 100 through a wireless interface. eNodeB 110 may manage wireless resources by cells, and therefore assign wireless resources to UE 100 in a corresponding cell. eNodeB 110 may establish a wireless channel with UE 100, and then communicate with UE 100 through the established channel. Furthermore, eNodeB 110 may receive uplink signals from UE 100 at a physical layer level, and transfer the received uplink signals to MME 112. eNodeB 110 may receive downlink signals from MME 112 at a physical layer level, and transfer the received downlink signals to UE 100. In other words, eNodeB 110 may perform a scheduling procedure and control an uplink transmission and/or a downlink transmission in connection with UE 100 and/or MME 112. Accordingly, eNodeB 110 may operate as an access point (AP) connecting UE 100 to core network 114. Herein, eNodeB 110 may be referred to as a base station (BS), an access point (AP), a radio access station (RAS), a Node B, a base transceiver station (BTS), a mobile multihop relay (MMR)-BS, but is not limited thereto.

MME 112 may be connected to core network 114 through a wired/wireless network. MME 112 may perform a mobility management and a bearer control, and manage connection information. Particularly, MME 112 may transmit quality of service (QoS) parameters to eNodeB 110 when a call setup is complete. Herein, the QoS parameters may be transferred from MME 112 to eNodeB 110 through an evolved radio access bearer (E-RAB) setup request message.

Core network 114 may be connected to MME 112 through a wired network. Such a wired network may be referred to as a backhaul link portion. Core network 114 may provide authentication and accounting functions for eNodeB 110. The wireless network of FIG. 1 may be, but is not limited to, a code division multiple access (CDMA) network, a time division multiple access (TDMA) network, a frequency division multiple access (FDMA) network, an orthogonal frequency division multiple access (OFDMA) network, or a single carrier frequency division multiple access (SC-FDMA) network. The CDMA network may be implemented by wireless techniques such as universal terrestrial radio access (UTRA), or CDMA 2000. UTRA may include wideband CDMA (W-CDMA) and low chip rate (LCR). The CDMA 2000 may cover IS-2000, IS-95, and IS-856 standards. The TDMA network may implement a radio technology such as Global System for Mobile Communications (GSM). The OFDMA network may implement a radio technology such as Evolved UTRA (E-UTRA), IEEE 802.11, IEEE 802.16, IEEE 802.20, and Flash-OFDM. UTRA, E-UTRA, GSM, Universal Mobile Telecommunication System (UMTS) and Long Term Evolution (LTE) may be described in documents from an organization named "3rd Generation Partnership Project" (3GPP). CDMA2000 may be described in documents from an organization named "3rd Generation Partnership Project 2" (3GPP2).

Meanwhile, UE 100 may be a wireless client device which is capable of transmitting signals to wireless access networks such as the LTE network and receiving signals from wireless access network through a wireless link. Such UE 100 may be referred to as a mobile station (MS), a mobile terminal (MT), an access terminal (AT), a user terminal (UT), a wireless terminal, a subscriber station (SS), a portable subscriber station (PSS), a subscriber unit, a wireless device, a wireless transmit/receive unit (WTRU), a mobile node, a station, etc. Furthermore, UE 100 may be, but not limited to, a smart phone, a cell-phone, a personal digital assistant (PDA), a wireless MODEM, a wireless communication device, a portable device, a laptop computer, a desktop computer, a wireless printer, a cordless telephone, a wireless local loop (WLL) station, etc.

Figure 2:
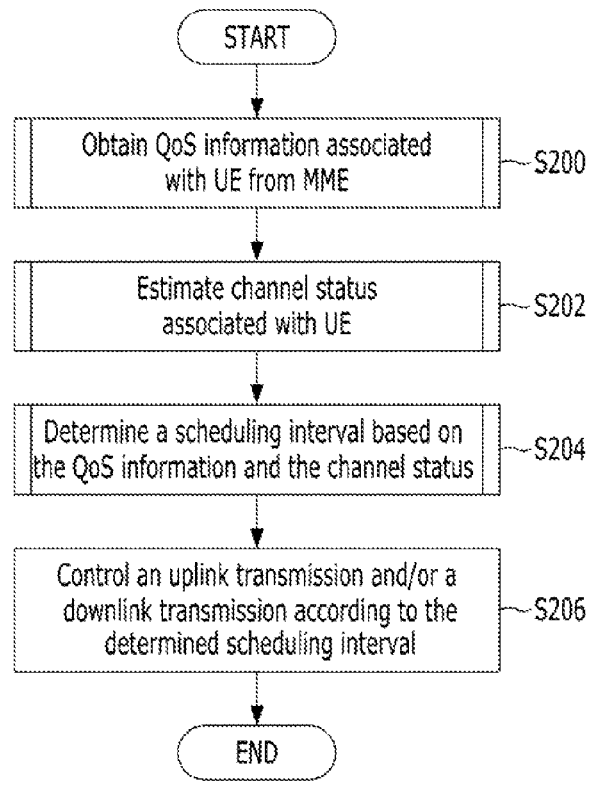
FIG. 2 illustrates performing a packet scheduling based on QoS information and/or a channel status associated with UE in a wireless communication network in accordance with at least one embodiment of the present invention.

FIG. 2 illustrates performing a packet scheduling based on QoS information and/or a channel status associated with UE in a wireless communication network in accordance with at least one embodiment of the present invention. Particularly, a packet scheduling such as a semi-persistent scheduling (SPS)

may be performed based on QoS information and/or a channel status associated with UE 100.

Referring to FIG. 2, eNodeB 110 may obtain QoS information associated with UE 100 from MME 112 at step S200. For example, eNodeB 110 may obtain the QoS information from an evolved radio access bearer (E-RAB) setup request message received from MME 112. Particularly, eNodeB 110 may obtain guaranteed bit rate (GBR) and delay information defined by a QoS class identifier (QCI). The QoS information obtaining procedure will be described in more detail with FIG. 3.

At step S202, eNodeB 110 may estimate a channel status associated with UE 100. For example, UE 100 may periodically report the channel status information (e.g., channel quality identifier (CQI)) to eNodeB 110. eNodeB 110 may estimate the channel status associated with UE 100 based on the reported channel status information. Herein, the estimated channel status may include at least one of a transmission rate per transmission time interval (TTI), a maximum number of allowed users per TTI, a maximum number of hybrid automatic repeat request (HARQ) retransmission, and/or a time delay in a wired network portion. The channel status estimation procedure will be described in more detail with FIG. 4.

At step S204, eNodeB 110 may determine an optimal scheduling interval (e.g., a SPS interval) based on the obtained QoS information and/or the estimated channel status. Herein, the determined scheduling interval may be applied to a SPS. The scheduling interval determination procedure will be described in more detail with FIG. 5.

At step S206, eNodeB 110 may control at least one of an uplink transmission and a downlink transmission according to the determined scheduling interval.

For example, in case of an uplink transmission, eNodeB 110 may transmit the determined scheduling interval to UE 100 in order to control the uplink transmission.

When receiving the determined scheduling interval, UE 100 may perform an uplink transmission procedure according to the received scheduling interval. When the received scheduling interval for the uplink transmission is 10 ms, UE 100 may transmit data through an uplink during a transmission time interval (TTI) (e.g., 1 ms) per 10 ms intervals.

In the case of the downlink transmission, eNodeB 110 may perform a downlink transmission procedure according to the determined scheduling interval.

Figure 3:
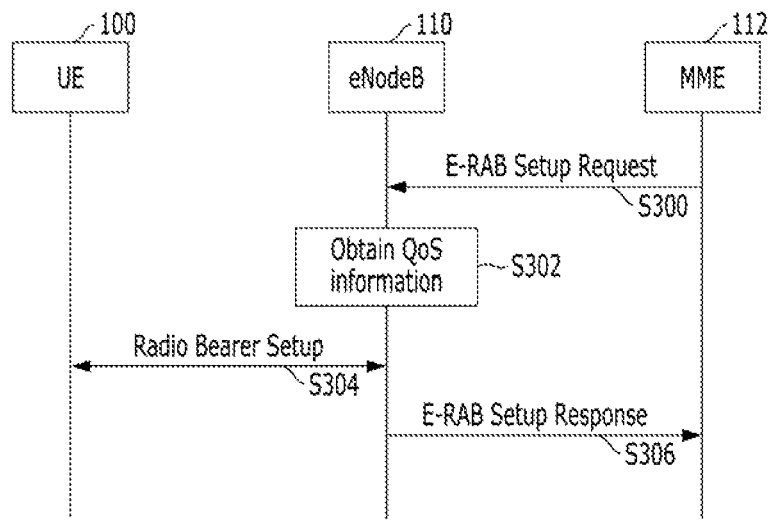
FIG. 3 illustrates obtaining QoS information associated with UE in accordance with at least one embodiment of the present invention.

FIG. 3 illustrates obtaining QoS information associated with UE in accordance with at least one embodiment of the present invention.

Referring to FIG. 3, when UE 100 initiates a call setup procedure, MME 112 may transmit an E-RAB setup request message to eNodeB 110 at step S300. That is, the E-RAB setup request message may be sent by MME 112 and be used to request eNodeB 110 to assign resources on "Uu" interface and/or "S1" interface for one or several E-RABs.

At step S302, eNodeB 110 may obtain QoS parameters from the E-RAB setup request message. Herein, the E-RAB setup request message may include E-RAB level QoS parameter containing QoS parameter, as shown in Table 1 below. That is, Table 1 may be a table regarding the E-RAB setup request message as described in "3rd Generation Partnership Project" (3GPP) TS 36.413.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB To Be Setup Item IEs | | 1 to <maxnoof E-RABs> | | | EACH | reject |
| >>E-RAB ID | M | | 9.2.1.2 | | — | |
| >>E-RAB Level QoS Parameters | M | | 9.2.1.15 | Includes necessary QoS parameters | — | |
| >>Transport Layer Address | M | | 9.2.2.1 | | — | |
| >>GTP-TEID | M | | 9.2.2.2 | EPC TEID | — | |
| >>NAS-PDU | M | | 9.2.3.5 | | — | |

E-RAB level QoS parameter may include a QoS class identifier (QCI), an allocation and retention priority (ARP), and/or GBR QoS information as shown in Table 2 below.

TABLE 2

| IE/Group Name | Presence | Range | IE type and reference | Semantics description |
|---|---|---|---|---|
| E-RAB Level QoS Parameters | | | | |
| >QCI | M | | INTEGER (0 ... 255) | QoS Class Identifier defined in [11]. Coding specified in [13] |
| >Allocation and Retention Priority | M | | 9.2.1.60 | |
| >GBR QoS Information | O | | 9.2.1.18 | This IE applies to GBR bearers only and shall be ignored otherwise. |

Herein, the ARP may be a parameter used by call admission control and overload control for control plane treatment of a bearer. That is, the ARP may be a priority indicator in order to allow a corresponding network to reject establishment or modification of new bearers or discard existing ones in cases of limited resources. GBR QoS information may include GBR and/or a maximum bit rate (MBR). The GBR may represent the bit rate that can be expected to be provided by a GBR bearer, while the MBR may indicate the upper limit of a GBR bearer.

The QCI may be a scalar value representing a set of packet forwarding treatments (e.g., scheduling weights, admission thresholds, queue management thresholds, and link layer protocol configuration). In other words, the QCI is an index referring to a number of different sets of minimum QoS characteristics, such as priority, delay, etc. required by a service. The different QCIs may be achieved by different packet forwarding treatments at network nodes. There are 9 standardized QCIs which are associated with example services as shown in Table 3 below.

TABLE 3

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc. |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |

Referring to Table 3, a guaranteed bit rate (GBR) may represent a minimum reserved traffic rate which a corresponding network guarantees, and may be valid for GBR bearers.

In summary, eNodeB 110 may obtain a QoS parameter (e.g., GBR) required by a wireless access system such as an LTE system, from the received E-RAB setup request message from MME 112. Further, eNodeB 110 may obtain packet delay information (e.g., packet delay budget) from the QoS parameter. Herein, the packet delay information may be defined by QCI.

Figure 5:
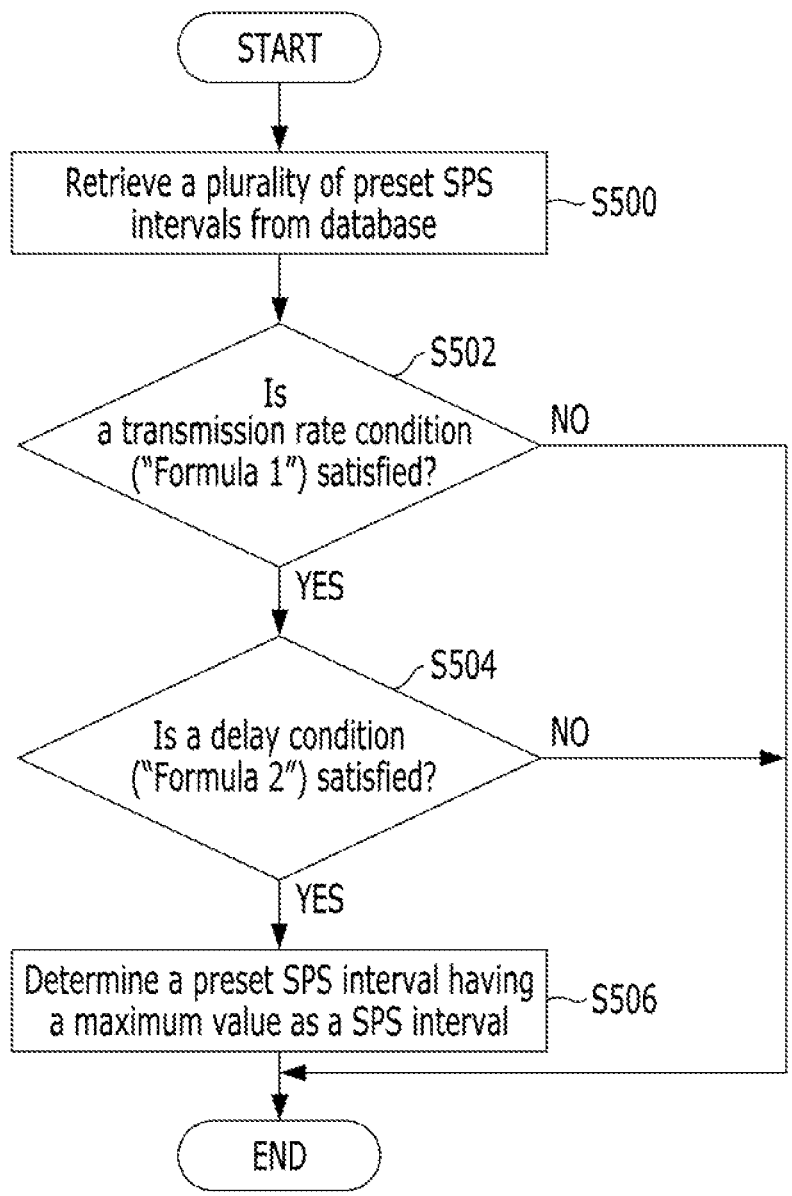
FIG. 5 illustrates determining a scheduling interval based on QoS information and/or a channel status associated with UE in accordance with at least one embodiment of the present invention.

Meanwhile, when the MBR for a user is sufficiently low and a packet delay is allowed for the user, eNodeB 110 may perform a SPS procedure. eNodeB 110 may determine a SPS interval by using a scheduling interval determination procedure (FIG. 5). Herein, the MBR may represent a maximum sustained traffic rate which a corresponding bearer may not exceed, and may be valid for GBR bearers. Further, in case of the SPS procedure, eNodeB 110 may control an uplink scheduling and/or a downlink scheduling according to the computed scheduling interval.

Returning to FIG. 3, at step S304, when receiving the E-RAB setup request message, eNodeB 110 may establish data radio bearer(s) and resources for bearers.

At step S306, eNodeB 110 may transmit an E-RAB setup response message to MME 112 in order to inform whether the setup of resources and establishment of each E-RAB was successful or unsuccessful.

Figure 4:
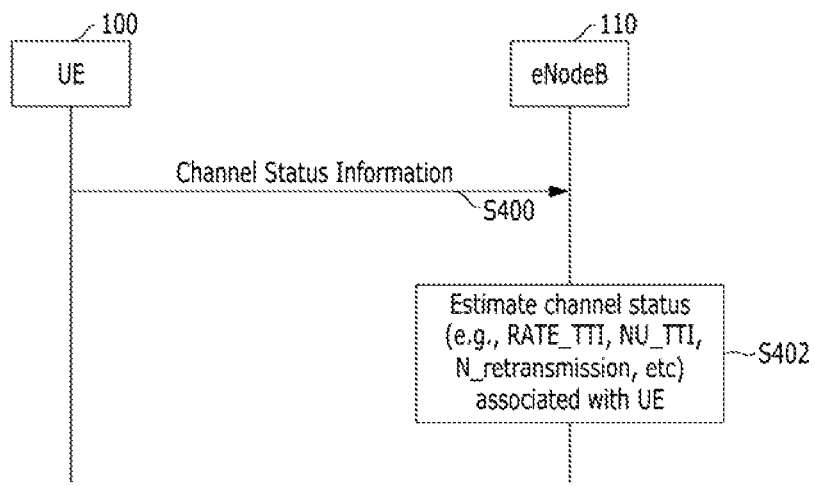
FIG. 4 illustrates estimating a channel status associated with UE in accordance with at least one embodiment of the present invention.

FIG. 4 illustrates estimating a channel status associated with UE in accordance with at least one embodiment of the present invention.

Referring to FIG. 4, eNodeB 110 may receive channel status information from UE 100 at step S400. UE 100 may periodically report the channel status information to eNodeB 110. Herein, the channel status information may include a channel quality indicator (CQI), a carrier level received signal strength indication (RSSI) and/or a bit error rate (BER).

At step S402, eNodeB 110 may estimate a channel status associated with UE 100 based on the received channel status information. For example, eNodeB 110 may estimate at least one of a transmission rate per TTI ("RATE_TTI"), a maximum number of allowed users per TTI ("NU_TTI"), a maximum number of hybrid automatic repeat request (HARD) retransmission ("N_retransmission"), and a time delay in a wired network portion ("D_wired"). Further, the estimated channel status may be stored in a database (e.g., database 740 as described below with respect to FIG. 7).

FIG. 5 illustrates determining a scheduling interval based on QoS information and/or a channel status associated with UE 100 in accordance with at least one embodiment of the present invention.

For example, eNodeB 110 may determine a scheduling interval based on QoS information (e.g., GBR, etc) obtained through a QoS information obtaining procedure (S200 and FIG. 3) and a channel status estimated through a channel status estimation procedure (S202 and FIG. 4). Hereinafter, for convenience of explanation, description will be given under the assumption that the scheduling interval is a SPS interval.

Referring to FIG. 5, eNodeB 110 may retrieve a plurality of preset SPS intervals which are stored in database 750 at step S500. Herein, the preset SPS interval(s) may be referred to as "candidate SPS interval(s)." For example, the plurality of preset SPS intervals may be preset to about {10, 20, 32, 40, 64, 80, 128, 160, 320, 640 (ms)}, and then be stored in database 740. The preset SPS intervals may be different depending on whether a scheduling type is an uplink scheduling or a downlink scheduling. Further, the preset SPS intervals may be preset to various values according to a user's usage and range of a wireless communication system or communication services.

At step S502, eNodeB 110 may determine whether each of the preset SPS intervals satisfies a transmission rate condition described by Formula 1 below.

$$\frac{RATE\_TTI}{INT\_SPS \times NU\_TTI} > R\_req\,(kbps) \qquad \text{[Formula 1]}$$

In Formula 1, RATE_TTI denotes a transmission rate per TTI, INT_SPS (ms) denotes a SPS interval, NU_TTI denotes a maximum number of allowed users per TTI, and R_req denotes a required transmission rate.

$$\frac{RATE\_TTI}{INT\_SPS \times NU\_TTI}(kbps)$$

may indicate a minimum transmission rate associated with UE 100. R_req may be set to GBR obtained from an E-RAB setup request message. Accordingly, when the minimum transmission rate is greater than GBR, the transmission rate condition may be satisfied. When applying the Formula 1, INT_SPS (ms) may be each preset SPS interval (i.e., each candidate SPS interval). If at step S502, eNodeB 110 determines that each of the preset SPS intervals does not satisfy the transmission rate condition described by Formula 1, the method ends.

Otherwise (e.g., "Yes"), at step S504, eNodeB 110 may determine whether respective preset SPS intervals satisfying the transmission rate condition ("Formula 1") satisfy a delay condition described by Formula 2 below.

$$INT\_SPS \times N\_retransmission < D\_req - D\_wired \text{ (ms)} \quad \text{[Formula 2]}$$

In Formula 2, N_retransmission denotes a maximum number of HARQ retransmission, D_req denotes delay information (e.g., packet delay budget) defined by a QCI, and D_wired denotes a time delay in a wired network portion. Further, D_req−D_wired may be a delay in a wireless network portion. For example, D_wired may be set to about 20 ms. When applying the Formula 2, INT_SPS (ms) may be each preset SPS interval (i.e., each candidate SPS interval).

The transmission rate condition ("Formula 1") and the delay condition ("Formula 2") for the SPS interval may be established based on the QoS information and the estimated channel status associated with UE 100. The SPS interval may be determined based on whether both the transmission rate condition and the delay condition are satisfied. Accordingly, preset SPS interval(s) (i.e., candidate SPS interval(s)) satisfying both the transmission rate condition and the delay condition may be referred to as "available SPS interval(s)" or "available candidate SPS interval(s)."

At step S506, eNodeB 110 may determine a maximum preset SPS interval satisfying both the transmission rate condition ("Formula 1") and the delay condition ("Formula 2") as a SPS interval (i.e., a final SPS interval). That is, eNodeB 110 may select one of the available preset SPS intervals, and then determine the selected available preset SPS interval as the final SPS interval. Further, eNodeB 110 may determine an available preset SPS interval having a comparatively large value as the final SPS interval.

For example, when available preset SPS intervals are about 20 ms and about 32 ms, eNodeB 110 may determine a maximum value (i.e., 32 ms) as the final SPS interval to be used in uplink and/or downlink transmissions.

In some embodiments in accordance to the present invention, eNodeB 110 may compute at least one SPS interval (i.e., available SPS interval(s)) satisfying both the transmission rate condition ("Formula 1") and the delay condition ("Formula 2") without using the preset SPS intervals. Herein, each of the at least one SPS interval may have an integer value. Thereafter, eNodeB 110 may select one of the computed available SPS intervals, and then determine the selected available SPS interval as the final SPS interval. Further, eNodeB 110 may determine an available SPS interval having a comparatively large value as the final SPS interval.

Figure 6:
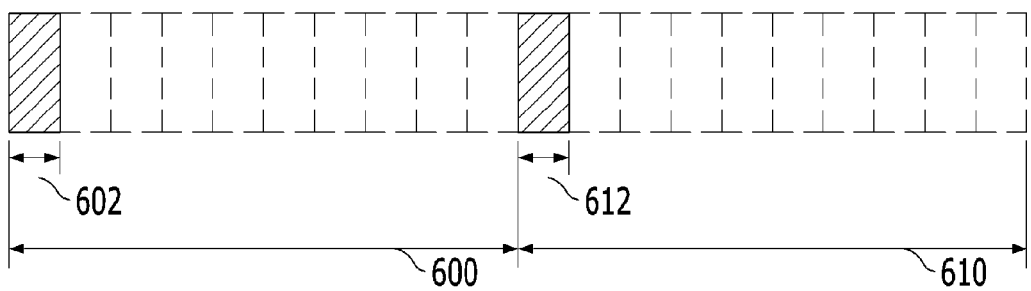
FIG. 6 illustrates a scheduling interval in accordance with at least one embodiment of the present invention.

FIG. 6 illustrates a scheduling interval in accordance with at least one embodiment of the present invention.

Referring to FIG. 6, "600" and "610" may represent two occurrences of a scheduling interval such as a SPS interval determined in FIG. 5, and "602" and "612" may represent TTI values of the occurrences, respectively. For example, in case of an uplink transmission, UE 100 may transmit uplink data to eNodeB 110 during TTI per the SPS interval. Unlike this, in case of a downlink transmission, eNodeB 110 may transmit uplink data to UE 100 during TTI per the SPS interval.

Further, a SPS interval in accordance with at least one embodiment of the present invention may be differently determined depending on whether a transmission type is an uplink transmission or a downlink transmission.

Figure 7:
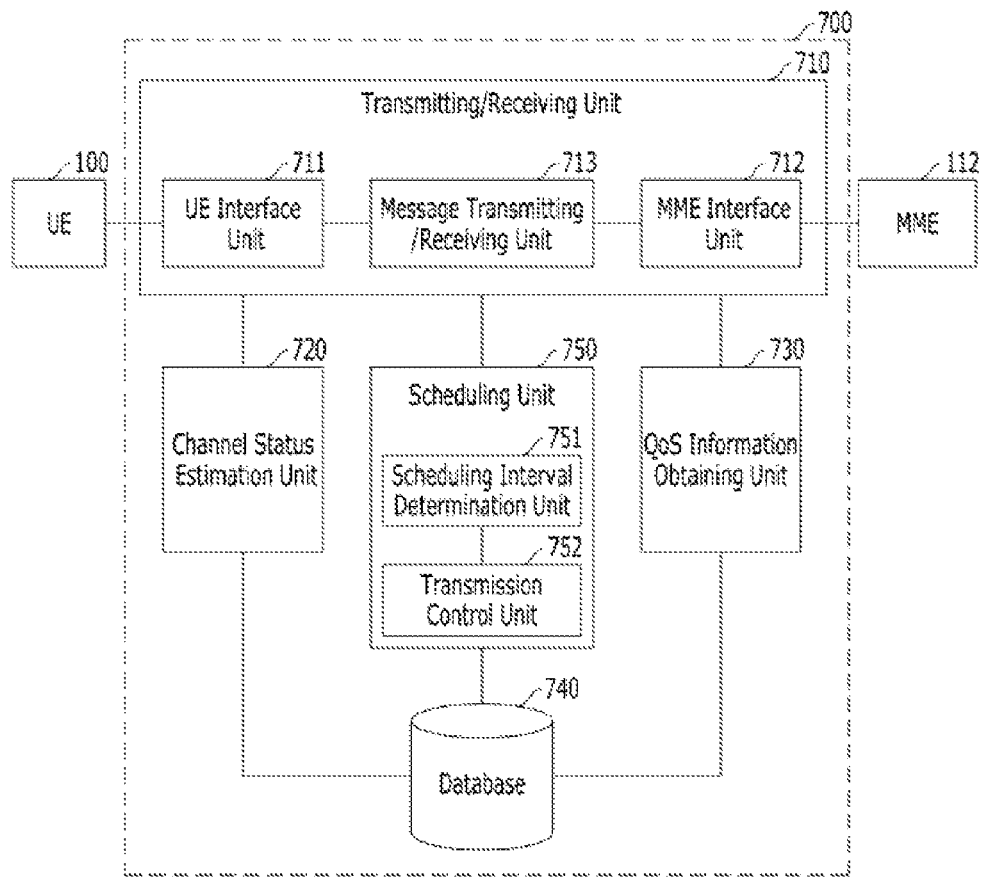
FIG. 7 illustrates an apparatus for performing a packet scheduling based on QoS information and/or a channel status associated with UE in a wireless communication network in accordance with at least one embodiment of the present invention.

FIG. 7 illustrates an apparatus for performing a packet scheduling based on QoS information and/or a channel status associated with UE in a wireless communication network in accordance with at least one embodiment of the present invention.

The apparatus may be illustrated as an independent apparatus in FIG. 7, but the present invention is not limited thereto. For example, the apparatus may be included in a base station as eNodeB 110.

As illustrated in FIG. 7, apparatus 700 may include transmitting/receiving unit 710, channel status estimation unit 720, QoS information obtaining unit 730, database 740, and Scheduling unit 750 in accordance with at least one embodiment of the present invention.

Apparatus 700 may perform operations described above with reference to FIG. 1 to FIG. 6. Accordingly, the detailed description thereof will be omitted herein. Each constituent element of apparatus 700 will be briefly described.

Transmitting/receiving unit 710 may be connected to UE 100 and MME 112, and perform a data transmission in connection with UE 100 and/or MME 112.

More specifically, transmitting/receiving unit 710 may include UE interface unit 711, MME interface unit 712, and/or message transmitting/receiving unit 713. Herein, UE interface unit 711 and MME interface unit 712 may perform an interface procedure such as a network connection in connection with UE 100 and MME 112 respectively. Message transmitting/receiving unit 713 may transmit and/or receive messages through UE interface unit 711 and/or MME interface unit 712, in connection with UE 100 and/or MME 112. For example, message transmitting/receiving unit 713 may receive an E-RAB setup request message including QoS information through MME interface unit 712 from MME 112. Further, message transmitting/receiving unit 713 may receive channel status information from UE 100 through UE interface unit 711. Message transmitting/receiving unit 713 may transmit a determined SPS interval to UE 100 through UE interface unit 711. Message transmitting/receiving unit 713 may perform an uplink transmission and/or a downlink transmission in connection with UE 100 under control of scheduling unit 750.

Channel status estimation unit 720 may estimate a channel status associated with UE 100 using the channel status information received from UE 100. Herein, the estimated channel status associated with UE 100 may include at least one of a transmission rate per TTI ("RATE_TTI"), a maximum number of allowed users per TTI ("NU_TTI"), a maximum number of hybrid automatic repeat request (HARM) retransmission ("N_retransmission"), and a time delay in a wired network portion ("D_wired"). Since the operation of channel status estimation unit 720 was already described with reference to FIG. 2 (especially, S202) and FIG. 4, the detailed description thereof is omitted.

QoS information obtaining unit 730 may obtain QoS information associated with UE 100 by parsing the E-RAB setup request message received from MME 112. For example, QoS information obtaining unit 730 may obtain GBR and delay information (e.g., packet delay budget) defined by QCI. Since the operation of QoS information obtaining unit 730 was already described with reference to FIG. 2 (especially, S200) and FIG. 3, the detailed description thereof is omitted.

Database 740 may store the channel status estimated by channel status estimation unit 720, and the QoS information obtained by QoS information obtaining unit 730. Further, database 740 may store a plurality of preset SPS intervals (i.e., candidate SPS intervals) and a determined scheduling interval (e.g., a SPS interval).

Scheduling unit 750 may determine a scheduling interval (e.g., a SPS interval) based on the obtained QoS information and/or the estimated channel status, and then may control at least one of an uplink transmission and a downlink transmission according to the scheduling interval determined by the determined scheduling interval.

More specifically, scheduling unit 750 may include scheduling interval determination unit 751 and/or transmission control unit 752.

Scheduling interval determination unit 751 may determine a scheduling interval (e.g., a SPS interval) based on the obtained QoS information and/or the estimated channel status. For example, scheduling interval determination unit 751 may determine a SPS interval based on whether the transmission rate condition ("Formula 1") and the delay condition ("Formula 2") for the SPS interval are satisfied. Herein, the transmission rate condition and the delay condition may be defined based on the QoS information and the estimated channel status associated with UE 100. Scheduling interval determination unit 751 may determine the scheduling interval using a plurality of preset SPS intervals which are stored in Database 740. Since the operation of scheduling interval determination unit 751 was already described with reference to FIG. 2 (especially, S204), FIG. 5, and FIG. 6, the detailed description thereof is omitted.

Transmission control unit 752 may control at least one of an uplink transmission and a downlink transmission according to the scheduling interval determined by scheduling interval determination unit 751. For example, in case of an uplink transmission, transmission control unit 752 may transmit the determined scheduling interval to UE 100 through transmitting/receiving unit 710, in order to control the uplink transmission. When receiving the determined scheduling interval, UE 100 may perform an uplink transmission procedure according to the received scheduling interval. Unlike this, in case of the downlink transmission, transmission control unit 752 may control transmitting/receiving unit 710 to perform a downlink transmission procedure according to the determined scheduling interval. Since the operation of transmission control unit 752 was already described with reference to FIG. 2 (especially, S206) and FIG. 6, the detailed description thereof is omitted.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of performing a packet scheduling in a wireless communication network, the method comprising:
obtaining quality of service (QoS) information associated with user equipment;
estimating channel status associated with the user equipment; and
determining a scheduling interval based on the obtained QoS information and the estimated channel status,
wherein the determining includes:
establishing a transmission rate condition and a delay condition based on the obtained QoS information and the estimated channel status; and
computing the scheduling interval based on whether the transmission rate condition and the delay condition are satisfied,
wherein the computing includes:
presetting a plurality of candidate intervals;
determining at least one available candidate interval based on the transmission rate condition and the delay condition; and
selecting one of the available candidate intervals as the scheduling interval.

2. The method of claim 1, further comprising:
controlling at least one of an uplink transmission and a downlink transmission according to the determined scheduling interval.

3. The method of claim 2, wherein the controlling includes transmitting the determined scheduling interval to the user equipment in case of the uplink transmission.

4. The method of claim 1, wherein the obtaining includes:
receiving a bearer setup request message from a mobility management entity (MME); and
extracting the QoS information from the received bearer setup request message.

5. The method of claim 4, wherein the extracting includes obtaining a guaranteed bit rate (GBR), and packet delay information defined by a QoS class identifier (QCI).

6. The method of claim 5, wherein the estimating includes:
receiving channel status information from the user equipment; and
estimating the channel status based on the received channel status information.

7. The method of claim 6, wherein the channel status includes at least one of a transmission rate per transmission time interval (TTI), a maximum number of allowed users per TTI, a maximum number of hybrid automatic repeat request (HARQ) retransmission, and a time delay in a wired network portion.

8. The method of claim 1, wherein the scheduling interval is a semi-persistent scheduling (SPS) interval.

9. The method of claim 8, wherein the transmission rate condition is defined by Formula 1 below:

$$\frac{\text{RATE\_TTI}}{\text{INT\_SPS} \times \text{NU\_TTI}} > R\_req \text{ (kbps)} \quad \text{[Formula 1]}$$

where RATE_TTI denotes a transmission rate per TTI, INT_SPS denotes the scheduling interval, NU_TTI denotes a maximum number of allowed users per TTI, and R_req denotes a GBR.

10. The method of claim 8, wherein the delay condition is defined by Formula 2 below:

$$\text{INT\_SPS} \times N\_retransmission < D\_req - D\_wired \text{ (ms)} \quad \text{[Formula 2]}$$

where N_retransmission denotes a maximum number of HARQ retransmission, D_req denotes a delay information defined by a QCI, and D_wired denotes a time delay in a wired network portion.

11. The method of claim 1, wherein the computing includes:
obtaining available scheduling intervals satisfying the transmission rate condition and the delay condition; and
determining the available scheduling interval having a comparatively large value as the scheduling interval.

12. The method of claim 1, wherein the selecting determines an available candidate interval having a comparatively large value as the scheduling interval.

13. The method of claim 1, wherein the candidate intervals are differently predetermined depending on whether the scheduling interval is for the uplink transmission or the downlink transmission.

14. An apparatus for performing a packet scheduling in a wireless communication network, the apparatus comprising:
a service quality information obtaining unit configured to obtain quality of service (QoS) information associated with user equipment;
a channel status estimation unit configured to estimate channel status associated with the user equipment; and
a scheduling interval determination unit configured to determine a scheduling interval based on the obtained QoS information and the estimated channel status,
wherein the scheduling interval determination unit is configured to:
establish a transmission rate condition and a delay condition based on the obtained QoS information and the estimated channel status; and
compute the scheduling interval based on whether the transmission rate condition and the delay condition are satisfied, and
wherein the scheduling interval determination unit is further configured to:
store a plurality of preset candidate intervals;
determine at least one available candidate interval based on the transmission rate condition and the delay condition; and
select one of the available candidate intervals as the scheduling interval.

15. The apparatus of claim 14, further comprising:
a transmission control unit configured to control at least one of an uplink transmission and a downlink transmission according to the determined scheduling interval.

16. The apparatus of claim 14, wherein the scheduling interval is a semi-persistent scheduling (SPS) interval.

17. The apparatus of claim 14, wherein the scheduling interval determination unit determines an available candidate interval having a comparatively large value as the scheduling interval.

18. The apparatus of claim 14, wherein the candidate intervals are differently predetermined depending on whether the scheduling interval is for the uplink transmission or the downlink transmission.

* * * * *